United States Patent [19]

Castenson

[11] Patent Number: 4,664,709
[45] Date of Patent: May 12, 1987

[54] AZOACYLACETAMIDE DISPERSING AGENTS AND AZO-PIGMENT COMPOSITIONS

[75] Inventor: Richard Castenson, Coventry, R.I.

[73] Assignee: American Hoechst Corporation, Somerville, N.J.

[21] Appl. No.: 704,822

[22] Filed: Feb. 25, 1985

[51] Int. Cl.$^4$ ............................................. C07C 107/06
[52] U.S. Cl. ................................. 106/23; 106/308 N; 534/576; 534/745; 534/746; 534/747
[58] Field of Search ............... 534/747, 576, 745, 746; 106/308 N, 23

[56] References Cited

FOREIGN PATENT DOCUMENTS 62304 11/1985 European Pat. Off. ............ 534/576
1139294 1/1969 United Kingdom .

Primary Examiner—Charles F. Warren
Assistant Examiner—C. S. Greason
Attorney, Agent, or Firm—Hugh C. Crall

[57] ABSTRACT

This invention is directed to new azoacylacetamide dispersing agents for azo pigments and azo pigment compositions made therefrom. The pigment compositions of this invention comprise a mixture of dispersing agents which are represented below by abbreviated Formula I and pigments which are represented by the abbreviated Formula II, wherein said dispersing agents are present in an amount of 1-25% and said pigments are present in an amount of 99 to 75%:

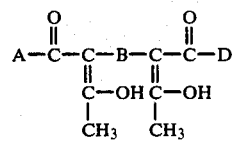

FORMULA I

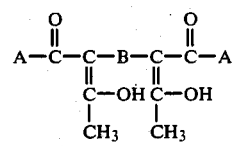

FORMULA II where:
A is an aromatic or heterocyclic amino group;
B is an aromatic or heterocyclic bisdiazonium group;
D is an aliphatic polyamino group containing at least three nitrogen atoms.

28 Claims, No Drawings

AZOACYLACETAMIDE DISPERSING AGENTS AND AZO-PIGMENT COMPOSITIONS

This invention provides an azo-pigment composition which is easily dispersible in solvent printing inks. The printing inks provided by this invention exhibit virtually no penetration through thin, uncoated paper stocks, high color strength, good viscosity characteristics, improved flow properties, excellent gloss and high stability against agglomeration.

BACKGROUND OF THE INVENTION

Important application properties of pigments for publication printing inks are good rheology, stability, gloss, color strength and holdout i.e. the absence of color penetration through the paper stock. Azo pigments have been treated with various amines to achieve these goals. Typical references illustrating such treatments are as follows: U.S. Pat. Nos. 3,532,520 (alkyldiamines), 3,759,733 (alkyl amines or amine oxides), 4,220,473 (dimer acid based amines), 4,462,833 (linear alkyl polyamines), and DE No. 3109 579 (amines with a pyrazolone mixed coupling).

British Pat. No. 1,139,294 teaches that the incorporation of certain azoacylacetamides containing one or two nitrogen atoms into diarylide pigments can yield a product that gives improved strength and flow to printing inks. Typical amide components disclosed in this reference are acetoacet-N-(3-dimethylaminopropyl)amide, acetoacet-N-(3-octadecylaminopropyl)amide and oleylamide. It does not, however, achieve the improved results of this invention.

SUMMARY OF THE INVENTION

This invention is directed to new azoacylacetamide compounds for use as dispersing agents in azo-pigment compositions and azo-pigment compositions made therefrom. The new azoacylacetamide dispersing agent of this invention may be represented by the Formula A:

FORMULA A

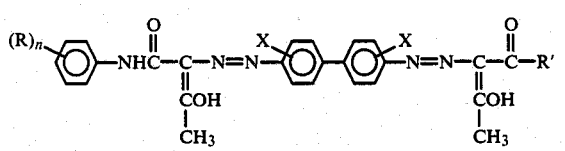

Where:
R is H or a substituent independently selected from the group consisting of —CH$_3$, —OCH$_3$, —OCH$_2$CH$_3$, —Cl.

n is an integer from 1 to 5, X is a substituent independently selected from the group consisting of —H, —Cl, —OCH$_3$, —OC$_2$H$_5$.

R' is a polyamino substituent having the general formula.

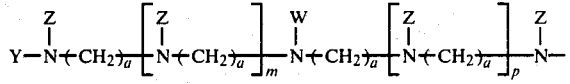

Where:
W and Y are substituents independently selected from the group consisting of R", H, alkyl and aryl with the proviso that at least one of the substituents is R".
R" is a long chain aliphatic substituent having 10 to 22 carbon atoms, preferably 14–18, m and p are integers from 0 to 3 preferably 0 and 1, a is an integer from 1–5, preferably 2–4, more preferably 3 and Z is independently selected from the group consisting of H, alkyl and aryl.

The improved azo-pigment compositions of this invention are a mixture of Formula A azoacylacetamides and azo-pigments having the formula:

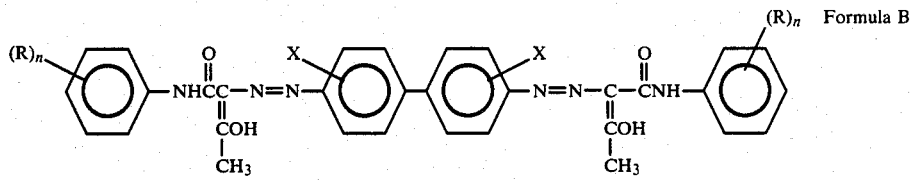

Formula B

Where R, n and X have the meanings set forth above.

The improved azo-pigment compositions of this invention may be made by physically mixing compounds represented by Formula A and B or by producing the mixture in situ by a mixed coupling of a bisdiazonium salt with a mixture of aromatic and aliphatic acylacetamides.

The improved azo-pigment compositions of this invention contain 1 to 25 percent by weight of the Formula A, azoacylacetamide compound, preferably 3 to 15 percent and most preferably 6 to 12 percent. The azo-pigments represented by Formula B being present in an amount of 99 to 75 percent by weight, preferably 97–85 percent and most preferably in an amount of 94–88 percent.

DESCRIPTION OF THE PREFERRED EMBODIMENTS

The diarylide pigment compositions of this invention can be prepared by mixing an azoacylacetamide Formula A component with an azo-pigment Formula B component. However, it is most advantageously prepared via the mixed coupling of a bisdiazonium compound with a mixture of an acylacetarylamide and an acylacet alkylamide.

Acylacetalkylamides and acylacetarylamides can be prepared in many ways, but the preferred method is to add diketene to a dilute acetic acid solution of the corresponding alkylamine and/or arylamine. The resulting acylacetalkylamide is soluble in the dilute acetic acid and the amide need not be isolated prior to use in the pigment coupling reaction. The acylacetalkylamide solution may be added to the acylacetarylamide at any convenient time prior to the coupling.

The acylacetamides of this invention are prepared from long chain alkyl amines having the following formula:

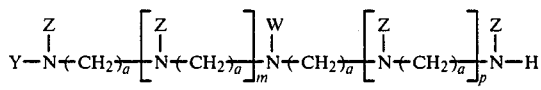

Where:
W and Y are substituents independently selected from the group consisting of R", H, alkyl and aryl, with the proviso that at least one of said substituents is R".
R" is a long chain aliphatic substituent having 10 to 22 carbon atoms, preferably 14–18, m and p are integers from 0 to 3, a is an integer from 1–5, preferably 2–4, more preferably 3 and Z is independently selected from the group consisting of H, alkyl and aryl.

Typical long chain alkylamines used in the preparation of the acylacetalkylamides according to this invention are: N-tallowalkyl-N-(3-aminopropyl)-1,3-diaminopropane, N-(3-tallowalkylaminopropyl)1,3-diaminopropane sold under the trademark Triamine-T, N-(N-(3-tallowalkylaminopropyl)-3-aminopropyl)-1,3 diaminopropane sold under the trademark Tallow-Tetramine N-oleylalkyl-N-(3-aminopropyl)-1,3-diaminopropane, and N-stearylalkyl-N-(3-aminopropyl)-1,3-diaminopropane. Alternatively, the nomenclature "3-aminopropylamine" may be used to define the "1,3-diaminopropane" group in these compounds.

The amount of Formula A acylacetamides in the compositions of this invention can vary from 1 to 25 percent by weight depending on the particular pigments and ink system, preferably 3 to 15 percent and more preferably 6 to 12 percent.

The azo-pigments of this invention are diarylide pigments having the following formula:

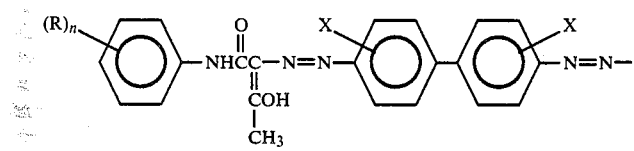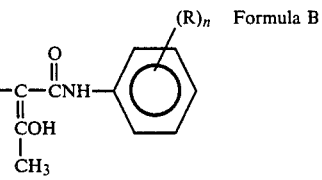

Formula B wherein R is H or a substituent independently selected from the group consisting of —CH$_3$, —OCH$_3$, —OCH$_2$CH$_3$ and —Cl; n is an integer from 1 to 5 and X is independently selected from the group consisting of H, —Cl, —OCH$_3$ and —OC$_2$H$_5$.

The preparation of diarylide pigments corresponding to Formula B by the coupling a bisdiazonium salt with an acylacetarylamide is well known in the art. Typical diarylide pigments are the reaction products of 3,3'-dichlorobenzidine and acetoacetanilide (CI Pigment Yellow 12), 3,3'-dichlorobenzidine and acetoacet-2-methylanilide, 3,3'-dichlorobenzidine and acetoacet-2,4-xylidide. Important diarylide pigments are color-index pigments Yellow 12 and 14; these two compounds are 2,2'-[(3,3'-dichloro[1,1'-biphenyl]-4,4'-diyl)bis(azo)]-bis[3-oxo-N-phenylbutanamide] and 2,2'-[(3,3'-dichloro[1,1'-biphenyl]-4,4'-diyl)bis(azo)]bis[N-(2-methylphenyl)-3-oxobutanamide], respectively.

The azo-pigment compositions of this invention contain 75 to 95 percent by weight of the diarylide pigments of Formula B; preferably 85 to 97 percent and more preferably 88 to 94 percent.

Other additives normally used in azo-pigment production (amines, extenders, surfactants) may be incorporated into the azo-pigment compositions of this invention to further improve certain properties in various ink systems.

The application of this invention is in printing inks, particularly solvent gravure inks. The major advantages of this invention are improved properties of the resulting printing ink. The inks have good viscosity and flow properties, improved holdout, gloss and color strength. In addition, it allows the production of cleaner, greener shaded yellow gravure ink pigments than is possible with traditional amine treatments.

This invention is illustrated by, but not limited to the following examples. All parts are by weight.

EXAMPLE I 25.3 Parts of 3,3'-dichlorobenzidine as the dihydrochloride salt are bisdiazotized by slurrying in 175 parts water and 34 parts of hydrochloric acid (31%) at ≦0° C. and rapidly adding 13.8 parts of sodium nitrite as a 40% aqueous solution. After stirring for about one hour, this solution is clarified and the volume adjusted to 350 parts.

32.5 Parts of acetoacetanilide and 8.2 parts of acetoacet-N-(3-tallowalkylaminopropyl)amide (component II) in a dilute acetic acid solution are added to 450 parts water containing 8.3 parts sodium hydroxide. Acetic acid—14 parts—is added under agitation conditions to the solution to precipitate the mixed amide. The bisdiazo solution is then added to the amide slurry over about 1½ hours while maintaining the temperature at about 20° C. and the pH at 4.5 with dilute sodium hydroxide solution. After the coupling, the pH is adjusted to about 9.5 with sodium hydroxide solution. The color mixture is heated to 98°–100° C., held for one hour, filtered, washed salt-free and the resulting pigment composition was dried at 110° C.

The acetoacet-N-(3-tallowalkylaminopropyl)amide solution used in this example was prepared as follows: 6.44 parts of N-tallowalkyl-1,3-diaminopropane (Armak Duomeen T) was dissolved in a solution of 0.6 parts acetic acid and 50 parts water. 1.76 parts diketene are added slowly and the resulting solution heated to about 80° C. The acetoacetanilide was prepared in a similar manner, well known in the art, by the acetoacetylation of aniline.

EXAMPLE II

A pigment composition was made following the process of Example I except that in place of component II, 3.7 parts of acetoacet-N-(3-dimethylaminopropyl)amide in solution were used. This solution was made similar to that in Example I using 2.0 parts 3-dimethylaminopropylamine.

EXAMPLE III

A pigment composition was made following the process of Example I except that in place of component II, 8.2 parts of acetoacet-N-(N-(3-aminopropyl)-3-tallowalkylaminopropyl)amide in solution (R"=tallow, m and p=0, a=3, Z=H) were used. This solution was made similar to that in Example 1 using 6.7 parts N-tallowalkyl-N-(3-aminopropyl)-3-aminopropylamine.

The pigment compositions from Examples I, II and III and an untreated CI Pigment Yellow 12 were dispersed at a concentration of 10% by weight in a typical publication gravure ink system of rosin salt (Jonrez MR521), clay and toluene. These dispersions were diluted to printing viscosity (35 seconds in a Zahn No. 1 cup) with toluene.

The untreated CI Pigment Yellow 12 could not be dispersed because the viscosity of the resulting paste was too high. The 10% dispersions made from the pigment compositions of Examples I and II were relatively high in viscosity requiring 30 ml. toluene/100 g. dispersion each while the dispersion made from the pigment composition of Example III required only 4 ml. toluene/100 g. dispersion to achieve printing viscosity. The reduced inks were then drawn down on coated, uncoated and "super" stock. Compared to both Example I and Example II pigment compositions, that of Example III showed more color strength and more gloss on all stocks. Surprisingly, the ink prepared from the pigment composition of Example III had almost complete holdout (no penetration) even on the very thin "super" stock. The other two inks had poor holdout—much yellow color penetrated to the back of the paper.

EXAMPLE IV

A pigment composition was made following the process of Example I except that in place of component II, 8.2 parts of acetoacet-N-(N-(3-tallowalkylaminopropyl)-3-aminopropyl)amide in solution were used (R"=tallow, m an p=0 and Z=H).

This solution was made similar to that in Example I using 6.7 parts N-(3-tallowalkylaminopropyl)-1,3-diaminopropane (Armak Triamine-T).

The resulting pigment composition was dispersed and drawn down as described in Example III. The initial 10% dispersion was relatively low in viscosity requiring only 12 ml./100 g. dispersion of toluene to reach printing viscosity. Similar to the ink made from the pigment composition of Example III, this ink had higher color strength and more gloss on all stocks than the inks made from the Example I and II pigment compositions. The Example IV product also exhibits excellent holdout.

EXAMPLE V

A pigment composition was made following the process of Example 1 except that in place of component II, 10.5 parts of acetoacet-N-(N-(N-(3-tallowalkylaminopropyl)-3-aminopropyl)amide in solution (R"=tallow, m=1,p=0, a=3, Z=H) were used. This solution was made similar to that in Example I using 8.7 parts of N-(N-(3-tallowalkylaminopropyl)-3-aminopropyl)-3-aminopropylamine (Tomah Products, Tallow Tetramine).

The resulting pigment was dispersed and drawn down as described in Example III. The initial 10% dispersion required only 12 ml./100 g. dispersion of toluene to reach printing viscosity. Similar to the inks of Examples III and IV, this product had higher color strength and more gloss on all stocks than that of Examples I and II. The Example V ink also had excellent holdout.

EXAMPLE VI

A pigment composition was made following the process of Example I except that in place of component II, 8.2 parts of acetoacet-N-(N-(3-aminopropyl)-3-oleylalkylaminopropyl) amide in solution were used. This amide is illustrated by the following formula:

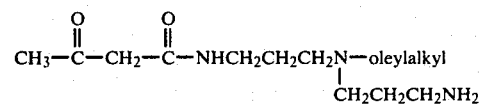

This solution was made similar to that in Example I using 6.8 parts of N-oleylalkyl-N-(3-aminopropyl)-3-aminopropylamine. The resulting pigment composition was dispersed and drawn down as described in Example III. The initial 10% dispersion was relatively low in viscosity requiring only 12 ml./100 grams dispersion of toluene to reach printing viscosity. Similar to the ink made in Example III, this pigment had higher color strength and more gloss on all stocks than the Examples I and II products. The ink from Example VI had excellent holdout.

EXAMPLE VII

A pigment composition was made following the process of Example I except that in place of component II, 7.1 parts of acetoacet-N-tallowalkylamide in solution were used. This amide is represented by the following formula:

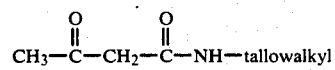

This solution was made similar to that in Example I using 4.8 parts of tallowamine (Armak).

The resulting pigment composition was dispersed and drawn down as described in Example III. The initial 10% dispersion was relatively high in viscosity requiring 20 ml./100 grams dispersion of toluene to reach printing viscosity. The ink from this pigment resembled the inks from Examples I and II in that it had less strength, much less gloss and much poorer holdout than the inks of Examples III-VI.

EXAMPLE VIII

A pigment composition was made following the process of Example III except that in place of the 32.5 parts of acetoacetanilide, 34.7 parts of acetoacetorthotoluidine were used.

EXAMPLE IX

A pigment composition was made following the process of Example I except that in place of the 32.5 parts of acetoacetanilide, 34.7 parts of acetoacetorthotoluidine were used. The resulting dry pigment composition along with the pigment composition from Example VIII was dispersed in the gravure ink system and drawn down as described in Example III. The 10% dispersion made from the pigment composition of Example VIII had a low viscosity requiring only 6 ml. toluene/100 grams dispersion to achieve printing viscosity while the dispersion made from the pigment composition of Example IX had a relatively high viscosity requiring 40 ml./100 grams dispersion. Compared to the ink made from the pigment composition of Example IX, the ink made from the pigment composition in Example VIII had more color strength and much more gloss. The ink made from pigment composition of Example VIII did not penetrate through the very thin "super" stock while the ink made from the pigment composition of Example IX penetrated very noticeably through the stock.

I claim:

1. An azoacylacetamide compound of the formula:

$$(R)_n-\text{C}_6\text{H}_4-\text{NHC}(=O)-\underset{\underset{CH_3}{|}}{\overset{COH}{|}}\text{C}-N=N-\text{C}_6\text{H}_3(X)-\text{C}_6\text{H}_3(X)-N=N-\text{C}\underset{\underset{CH_3}{|}}{\overset{COH}{|}}-\text{C}(=O)-R'$$

wherein

R is H or a substituent independently selected from the group consisting of —CH₃, —OCH₃, —OCH₂CH₃, and —Cl; n is an integer from 1 to 5, X is independently selected from the group consisting of —H, —Cl, —OCH₃, —OC₂H₅;

R' is a polyamino substituent having the formula $$Y-\underset{\underset{}{|}}{\overset{Z}{N}}+CH_2)_a\left[\underset{\underset{}{|}}{\overset{Z}{N}}+CH_2)_a\right]_m \underset{\underset{}{|}}{\overset{W}{N}}+CH_2)_a\left[\underset{\underset{}{|}}{\overset{Z}{N}}+CH_2)_a\right]_p \underset{\underset{}{|}}{\overset{Z}{N}}-$$

wherein

W and Y are a substituent independently selected from the group consisting of R'', H, alkyl and aryl with the proviso that at least one of the substituents is R'', and wherein R'' is a long chain aliphatic substituent having 10 to 22 carbon atoms, m and p are integers from 0 to 3, a is an integer from 1–5, and Z is independently selected from the group consisting of H, alkyl and aryl.

2. An azoacylacetamide as defined in claim 1 wherein n is 5, m and p are 0 to 1, a is 2–4, R'' is 14–18 carbon atoms and Z is selected from the group consisting of H and alkyl.

3. An azoacylacetamide as defined in claim 2 wherein R is selected from the group consisting of H, —CH₃ and —OCH₃.

4. An azoacylacetamide as defined in claim 3 wherein X is selected from the group consisting of —Cl, —OCH₃ and H.

5. An azoacylacetamide as defined in claim 4 wherein n=1 and R is selected from the group consisting of H and —CH₃.

6. An azoacylacetamide as defined in claim 5 wherein X is —Cl.

7. An azoacylacetamide as defined in claim 6 wherein a is 3.

8. An azoacylacetamide as defined in claim 7 wherein Z is H.

9. An azoacylacetamide as defined in claim 8 wherein W and Y are independently from the group consisting of H, oleyl, stearyl and tallow.

10. An azoacylacetamide as defined in claim 9 wherein the polyamino substituent, R', is selected from the group consisting of:

N-tallowalkyl-N-(3-aminopropyl)-3-aminopropylamino,
N-(3-tallowalkylaminopropyl)-3-aminopropylamino,
N-(N-(3-tallowalkylaminopropyl)-3-aminopropyl)-3-aminopropylamino,
N-oleylalkyl-N-(3-aminopropyl)-3 aminopropylamino, and
N-stearylalkyl-N-(3-aminopropyl)-3 aminopropylamino.

11. An azo-pigment composition comprising:
(1) 1 to 25 percent by weight of an azo-acylacetamide as defined in claim 1, 4 or 10 and
(2) 75 to 99 percent by weight of an arylide pigment having the formula:

$$(R)_n-\text{C}_6\text{H}_4-\text{NHCC}\underset{\underset{CH_3}{|}}{\overset{COH}{|}}(=O)-N=N-\text{C}_6\text{H}_3(X)-\text{C}_6\text{H}_3(X)-N=N-\text{C}\underset{\underset{CH_3}{|}}{\overset{COH}{|}}-\text{CNH}(=O)-\text{C}_6\text{H}_4-(R)_n$$

wherein R is H or a substituent independently selected from the group consisting of —CH₃, —OCH₃, —OCH₂CH₃ and —Cl; n is an integer from 1 to 5 and X is independently selected from the group consisting of —H, —Cl, —OCH₃, and —OC₂H₅.

12. An azo-pigment composition according to claim 11 wherein said azoacylacetamide is present in an amount of about 3 to 15 percent by weight and said arylide pigment is present in an amount of about 85 to 97 percent by weight.

13. An azo-pigment composition according to claim 11 wherein said azoacylacetamide is present in an amount of about 6 to about 12 percent by weight and said arylide pigment is present in an amount of about 88 to about 94 percent by weight.

14. An azo-pigment composition according to claim 11 wherein said arylide pigment wherein X is selected from the group consisting of —Cl, —OCH₃ and H and R is selected from the group consisting H and —CH₃ and n is 1.

15. An azo-pigment composition according to claim 12 wherein said arylide pigment, X is selected from the group consisting of —Cl, OCH₃ and H, and R is selected from the group consisting of H and —CH₃ and n is 1.

16. An azo-pigment composition according to claim 13 wherein said arylide pigment, X is selected from the group consisting of —Cl, —OCH₃ and H, and R is selected from the group consisting of H and —CH₃, and n is 1.

17. An azo-pigment composition according to claim 11 wherein said arylide pigment is selected from the group consisting of C.I. Yellow 12 and C.I. Yellow 14.

18. An azo-pigment composition according to claim 12 wherein said arylide pigment is selected from the group consisting of C.I. Yellow 12 and C.I. Yellow 14.

19. An azo-pigment composition according to claim 13 wherein said arylide pigment is selected from the group consisting of C.I. Yellow 12 and C.I. Yellow 14.

20. A printing ink containing an azo-pigment composition according to claim 11.

21. A printing ink containing an azo-pigment composition according to claim 12.

22. A printing ink containing an azo-pigment composition according to claim 13.

23. A printing ink containing an azo-pigment composition according to claim 14.

24. A printing ink containing an azo-pigment composition according to claim 15.

25. A printing ink containing an azo-pigment composition according to claim 16.

26. A printing ink containing an azo-pigment composition according to claim 17.

27. A printing ink containing an azo-pigment composition according to claim 18.

28. A printing ink containing an azo-pigment composition according to claim 19.

* * * * *